United States Patent
Pagliughi et al.

(10) Patent No.: US 10,885,232 B2
(45) Date of Patent: Jan. 5, 2021

(54) COMPUTER-IMPLEMENTED METHOD OF DESIGNING A SUPPORTING STRUCTURE FOR THE PACKAGING OF A SOLID OBJECT

(71) Applicant: Dassault Systemes, Velizy Villacoublay (FR)

(72) Inventors: Pierre Pagliughi, Paris (FR); Pascal Hebrard, Velizy (FR); Rohan Keswani, Pune (IN); Patrick Merlat, Suresnes (FR)

(73) Assignee: Dassault Systemes, Velizy Villacoublay (FR)

( * ) Notice: Subject to any disclaimer, the term of this patent is extended or adjusted under 35 U.S.C. 154(b) by 420 days.

(21) Appl. No.: 16/002,168

(22) Filed: Jun. 7, 2018

(65) Prior Publication Data
US 2018/0365345 A1    Dec. 20, 2018

(30) Foreign Application Priority Data
Jun. 19, 2017    (EP) .................................... 17305751

(51) Int. Cl.
*G06F 30/00*    (2020.01)
*G06T 17/10*    (2006.01)
(Continued)

(52) U.S. Cl.
CPC ............. *G06F 30/00* (2020.01); *G06T 17/10* (2013.01); *G06F 2111/10* (2020.01); *G06F 2113/20* (2020.01); *G06F 2119/18* (2020.01)

(58) Field of Classification Search
CPC .. G06F 30/00; G06F 2119/18; G06F 2113/20; G06F 2111/10; G06T 17/10
See application file for complete search history.

(56) References Cited

U.S. PATENT DOCUMENTS 8,646,603 B2 * 2/2014 Ramirez et al. ........ B65D 85/42
                                                          206/419
8,770,407 B2 * 7/2014 Laupie et al. ........ B65D 21/023
                                                          206/504
(Continued)

FOREIGN PATENT DOCUMENTS

WO    02072438 A1    9/2002

OTHER PUBLICATIONS

Wang et al., Optimization of bracing and internal support locations for beams against lateral buckling, 1995, Springer-Verlag, 6 pages, retrieved from the internet <URL: link.springer.com/article/10.1007/BF01742638>, [Retrieved on Sep. 14, 2020] (Year: 1995).*

(Continued)

*Primary Examiner* — Jyoti Mehta
*Assistant Examiner* — Nupur Debnath
(74) *Attorney, Agent, or Firm* — Hamilton, Brook, Smith & Reynolds, P.C.

(57) ABSTRACT

A computer-implemented method designs and manufactures a supporting structure for the packaging of a solid object. The supporting structure comprises a plurality of linear support elements that sustain the solid object inside a packaging container. The method includes: a) providing, as an input, a three-dimensional model of the solid object; b) computing a first cumulative linear mass density distribution of the solid object according to a first axis (x); and c) using said first cumulative linear mass density distribution to determine the positions, along said first axis, of linear support elements oriented transversally to said first axis. The resultant positions enable even distribution of the weight of the solid object among the linear support elements. A computer program product, computer-readable data-storage medium, and CAD system carry out such a method.

16 Claims, 5 Drawing Sheets

(51) Int. Cl.
*G06F 111/10* (2020.01)
*G06F 113/20* (2020.01)
*G06F 119/18* (2020.01)

(56) References Cited

U.S. PATENT DOCUMENTS

| | | | |
|---|---|---|---|
| 2003/0070951 A1* | 4/2003 | Hurley et al. ......... | B65D 65/00 206/427 |
| 2011/0054849 A1* | 3/2011 | Walker et al. .......... | G06F 17/50 703/1 |
| 2013/0240392 A1* | 9/2013 | LaLonde et al. ...... | B25H 3/003 206/349 |

OTHER PUBLICATIONS

Srivastava et al., Structural Optimization Methods: A General Review, May 2017, IJIRSET, vol. 6 Special Issue 9, www.ijirset.com/upload/2017/cotii/17_ME_COTII_Structural_Optimization_Methods_A_General_Review.pdf>, [Retrieved on Sep. 14, 2020] (Year: 2017).*

European Search Report for Int'l Application No. 17305751.4, entitled "Computer-Implemented Method of Designing a Supporting Structure for the Packaging of a Solid Object," consisting of 9 pages, dated Dec. 22, 2017.

\* cited by examiner

COMPUTER-IMPLEMENTED METHOD OF DESIGNING A SUPPORTING STRUCTURE FOR THE PACKAGING OF A SOLID OBJECT

RELATED APPLICATION(S)

This application claims priority under 35 U.S.C. § 119 or 365 to Europe, Application No. 17305751.4, filed Jun. 19, 2017. The entire teachings of the above application(s) are incorporated herein by reference.

FIELD OF INVENTION

The invention relates to the field of Computer Aided Design (CAD) applied to structural packaging.

BACKGROUND

Industrial products, such as car components or other mechanical parts, have to be packaged in order to be stored and/or to be shipped to a client or, more generally, to a different site. Packaging allows preserving the integrity of the product during transport and makes its handling and storage easier—for instance, boxes having a generally parallelepiped outline can be easily stacked, while objects with a complex shape cannot.

Figure 1:
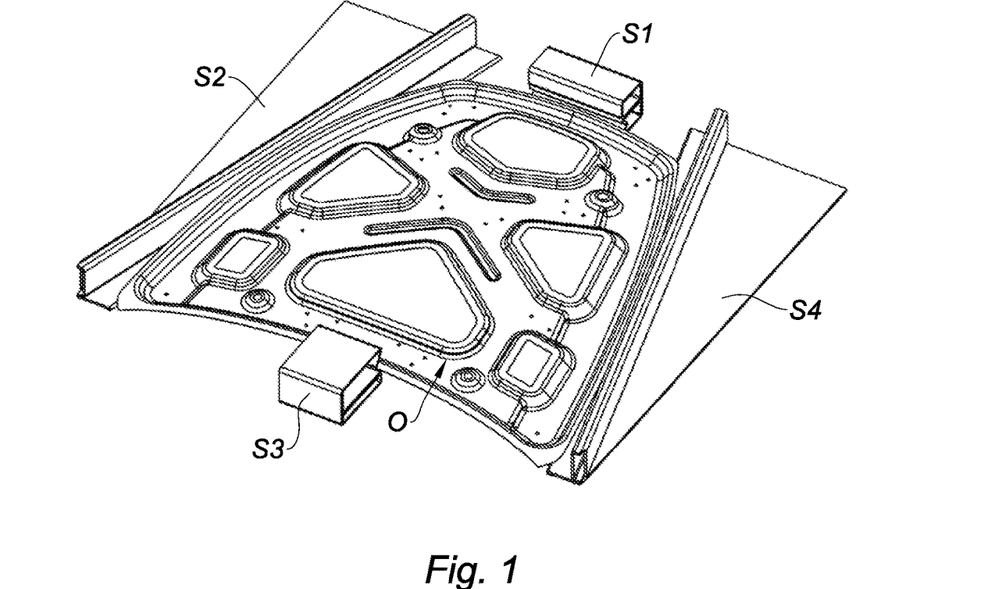
FIG. 1, an example of the packaging of a solid object (a car door) according to the prior art.

The packaging of solid products often comprises two parts: a packaging container, such as a box, and one or more supporting structures intended to hold the object inside the container to ensure its integrity. According to the prior art, the supporting structure is designed on an ad hoc basis, depending on the specific features of the object to be packaged. For instance, FIG. 1 show a supporting structure constituted by four separate support elements S1, S2, S3, S4 made of folded cardboard, used for holding a car's door O inside a box (not represented).

This approach is not entirely satisfactory, as the design process is complex and time-consuming, with a result which is highly dependent on the designer's skills. It often results in a waste of material, an unnecessary increase of the package weight and, in the worst cases, an insufficient holding of the object within the container.

SUMMARY

The invention aims at overcoming these drawbacks of the prior art. More particularly, it aims at providing a highly automated method for designing and manufacturing supporting structures requiring a reduced, and possibly minimal, amount of material while effectively ensuring the preservation of the object's integrity.

An object of the present invention, allowing achieving this aim, is a computer-implemented method of designing a supporting structure for the packaging of a solid object having a weight, the supporting structure comprising a plurality of linear support elements suitable to sustain the solid object inside a packaging container, the method comprising the steps of:

a) providing, as an input, a three-dimensional model of the solid object;
b) computing a first cumulative linear mass density distribution of the solid object according to a first axis; and
c) using said first cumulative linear mass density distribution to determine the positions, along said first axis, of a first plurality of said linear support elements oriented transversally to said first axis, said positions being such that the weight of the solid object is evenly distributed among the linear support elements of said first plurality.

According to particular embodiments of such a method:
step b) may also comprise computing a second cumulative linear mass density distribution of the solid object according to a second axis, non parallel to said first axis; and step c) may also comprise using said second cumulative linear mass density distribution to determine the positions, along said second axis, of a second plurality of said linear support elements oriented transversally to said second axis, said positions being such that the weight of the solid object is also evenly distributed among the linear support elements of said second plurality.

Said first and second axes may be mutually perpendicular.

The method may further comprise a step d) of automatically defining cutouts for allowing intersections between support elements of said first and second pluralities.

Step b) may comprises computing the following sub-steps:
b1) sampling the solid object along said or each said axis;
b2) computing a weight of each sample;
b3) computing said or each said linear mass density distribution by interpolating the weight of the samples along the axis; and
b4) computing said or each said cumulative linear mass density distribution by numerically integrating said or each said linear mass density distribution.

More particularly, sub-step b3) may be carried out by spline interpolation.

Step c) may further comprise determining a number of support elements as a function of the weight of the solid object and of a maximum load of each support element.

The method may further comprise a step a') of allowing a user to select at least a support element type from a database.

The method may further comprise a step e) of automatically defining cut-lines defining, for each support element, a profile matching a local shape of the solid object.

The method may further comprise a step f) of creating a three-dimensional model of the supporting structure, comprising said linear support elements taking the positions determined at step c).

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

Another object of the invention is a Computer Aided Design system comprising a processor coupled to a memory and a graphical user interface (IF), the memory storing computer-executable instructions to cause the Computer Aided Design system to carry out such a method.

Another object of the invention is a method of manufacturing a supporting structure for the packaging of a solid object comprising:
a step of designing said supporting structure using a method as defined above; and
a step of physically manufacturing said supporting structure, as designed.

Another object of the invention is a supporting structure for the packaging of a solid object obtained by such a method of manufacturing.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show.

DETAILED DESCRIPTION

A description of example embodiments follows.

According to the invention, the supporting structure comprises at least a set of linear support elements—typically having the shape of a vertical slab with an "I", "V" or "U"-shaped cross section—aligned along an axis and parallel to each other. Preferably, the upper edges of the support elements are carved along cut-lines defining profiles locally matching the shape of the solid object. An important feature of the invention is that the position of the support elements along the axis is automatically determined in such a way that the weight of the solid object is evenly distributed among the linear support elements; otherwise stated, each support element carries the same load.

In a preferred embodiment, the supporting structure comprises two set of support elements aligned along respective axes which are not parallel and are preferably perpendicular to each other.

Figure 2:
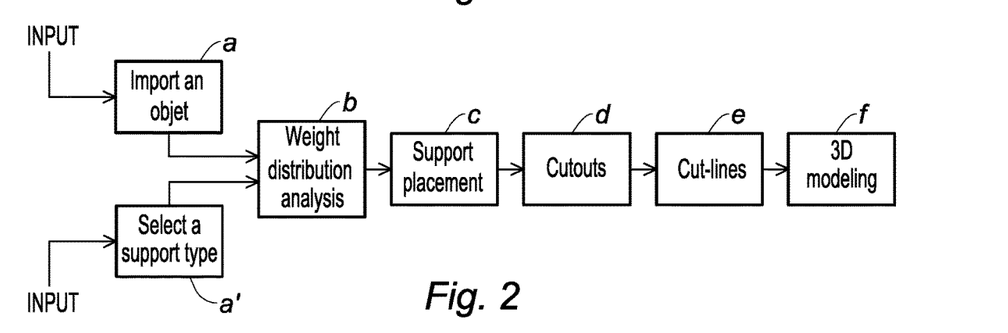
FIG. 2, a high-level flow chart of a method of designing a supporting structure for the packaging of a solid object according to an embodiment of the invention.

FIG. 2 is a flow-chart of a method according to an embodiment of the invention. The steps of this method are schematically illustrated by FIG. 3.

The method begins when the user imports, in a working environment created by a suitable computer program, an object to be packaged, or rather a three-dimensional numerical model thereof (step a). The import may be performed using conventional interface devices, and the object's three-dimensional numerical model may be imported by a suitable database. Within the present context, "three-dimensional" (or "3D") means that the model allows a three-dimensional (3D) representation of the object, and therefore its viewing from all angles. The 3D model of the object may e.g. be created using CAD software.

Importantly, the three-dimensional model of the object is not purely geometric but also include physical information, in particular a possibly non-homogeneous mass density distribution.

Figure 3:
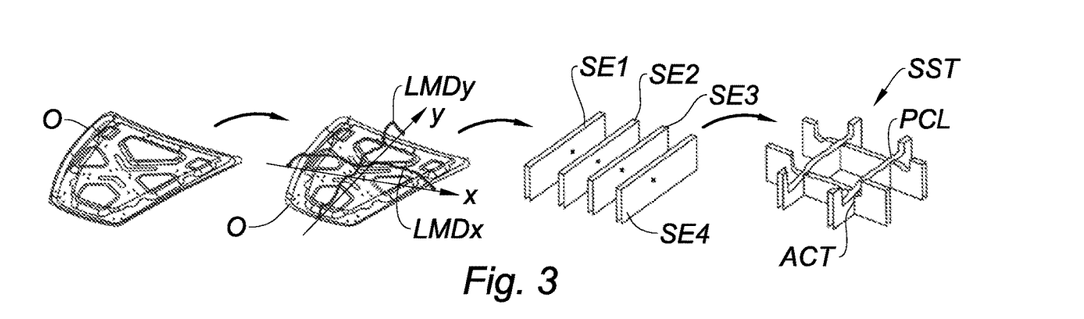
FIG. 3, a graphical representation of the steps of the method of FIG. 2.

On FIG. 3, reference O identifies a three-dimensionally modelled object, specifically a car door.

The user may also select, from another database and using the same or a different interface device, a support type for realizing the supporting structure (step a'). Considering the case of slab-shaped linear support elements, a support type may be characterized by its dimensions (length, height, thickness), its material (e.g. cardboard, polystyrene . . . ), the maximum load it can carry and the position and length of its assembly slits, if applicable (see FIG. 7). Step a' may also include importing three-dimensional models of supporting elements of the selected type.

Then (step b) the computer uses the 3D model of the object O to compute linear mass density distributions of said object along one or (preferably) two axes. The linear mass density distributions are then integrated along their respective axes to give cumulative linear mass density distributions. If two axes are used, they should be nonparallel and preferably perpendicular to each other. On FIG. 3, the two mutually perpendicular axes are designated by references "x" and "y", and the plots of the corresponding linear mass density distributions by "LMDx" and "LMDy", respectively. Cumulative distributions are not represented to avoid overcharging the figure.

Step b) can be called a "weight distribution analysis". Indeed, what is really important for the placement of the support elements is the distribution of the weight of object O, rather than of its mass. However, weight and mass are strictly proportional, and therefore they can be used interchangeably.

A possible implementation of step b) will be described in greater detail with reference to FIGS. 4A to 4C and 5.

During step c), "optimal" positions for number of linear support elements, of the type chosen by the user in step a'), are computed from the cumulative linear mass density distributions obtained in step b). The support elements are aligned along the axes—x and y in the example of FIG. 2—along which mass density distributions have been computed, and oriented transversally, and preferably perpendicularly, to said axes. FIG. 3 shows four support elements SE1, SE2, SE3 and SE4, aligned along axis x and oriented perpendicularly to it (and therefore parallel to axis y). As it will be explained later, with reference to FIG. 6, the cumulative linear mass density distributions are used to determine the positions of the support elements along axis x such that the weight of the object O is evenly distributed among them. The number of support elements may be inputted by the user, or it may be computed automatically to ensure that none of the support elements carries a weight exceeding its maximum allowed load.

Step d) is only carried out when the supporting structure comprises at least two sets of support elements, aligned along different axes and therefore intersecting. It consists in defining assembly slits in correspondence to the crossings of support elements having different orientations. Often, only the position of the slits along the principal dimension (length) of the support elements will have to be defined as the slit length will be fixed for a given support type. The support type definition may also determine if the slit is situated on the "upper" or on the "lower" side of the support element (the upper side being the one in contact with the object O). Step d) is not always required; for instance, in some cases, the supporting structure could be integrally manufactured, e.g. by molding.

Step e) consists in defining cut-lines along which the upper side or edge of each support element shall be carved in order to take a profile matching the local shape of the solid object. The cut-lines are obtained by computing the intersection of the 3D model of the object with a 3D model of each support element, taking the position determined at step c). In some embodiments, the user will have the possibility of adjusting the position of the object O along a vertical axis (z, not represented, perpendicular to x and y); in other embodiments the z position will be automatically computed taking into account the size of the packaging container (box) and of the object (see below, in reference to FIG. 8).

Finally, step f) consists in creating a three-dimensional model of the supporting structure comprising the support elements taking the positions determined at step c), assembled e.g. using the cutout defined at step d) and having an upper side cut as defined in step e). Reference SST on FIG. 3 designates such a model; references ACT and PCL designate the assembly cut-out defined at step d) and the cut-lines defined at step e), respectively.

The designed and modeled structure SST can then be manufactured using conventional techniques.

FIGS. 4A-4C and 5 illustrate different sub-steps of the weight distribution analysis step (b).

Figure 4A:
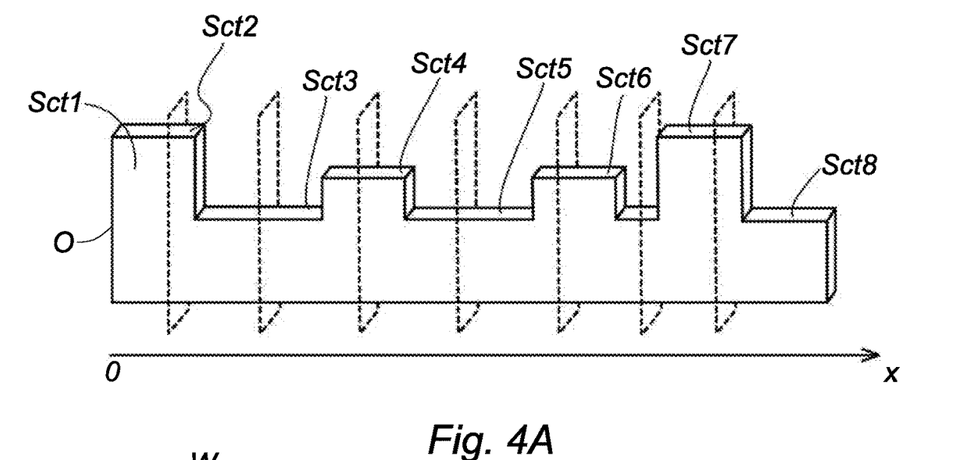
FIGS. 4A-4C, the computation of a linear mass density distribution of the solid object according to an embodiment of the invention.

As shown on FIG. 4A, the object O is sampled along axis x, by notionally cutting it into a predetermined number of section having the same length: Sct1, Sct2, Sct3, Sct4, Sct5, Sct6, Sct7 and Sct8. Then, the mass of each section is computed. If the object is homogeneous, this simply involves computing the volume of each section and multiplying it by a constant mass density (actually, this multiplication is unnecessary, as the mass density can be normalized to 1). In other cases, the object will be constituted by different materials, having respective mass densities. In this case, it will be necessary to compute separately the volume occupied by each material within each section, and to multiply it by the corresponding mass density.

Figure 4B:
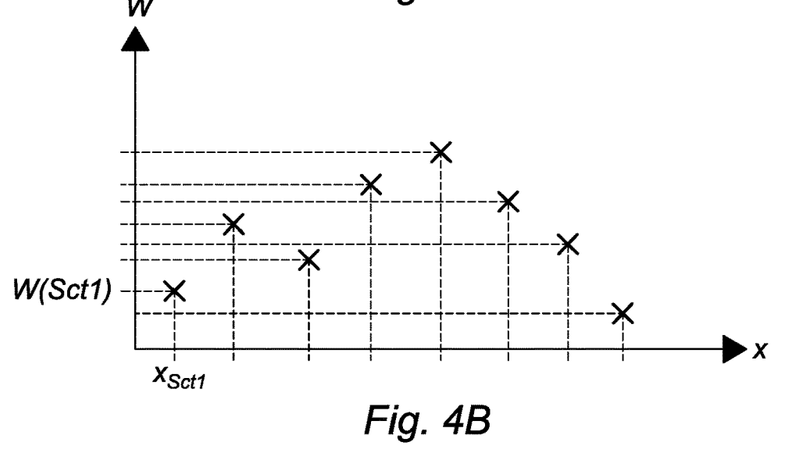
Figure 4C:
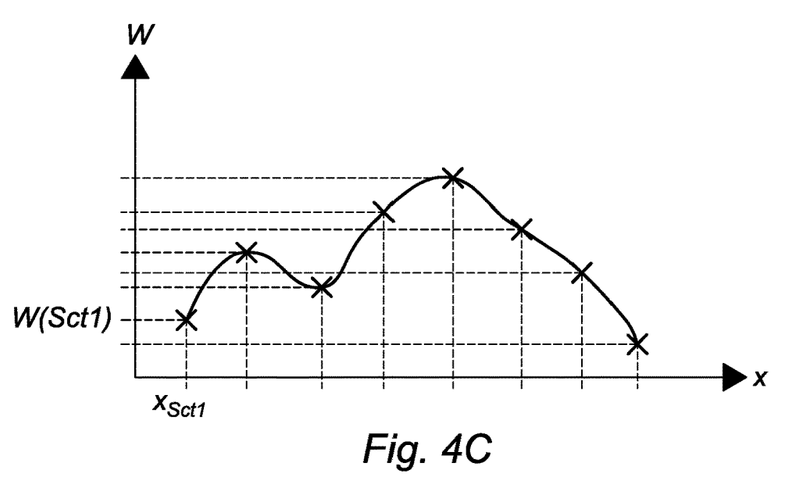

FIG. 4B is a plot wherein the mass (weight) W of each section is associated to the x coordinate of the center of the section (defined e.g. as its mid-point along the x axis or, preferably, as its center of mass). For instance, $x_{set1}$ is the x-coordinate of the center of the section Sct1; it is associated to W(Sct1), which is the mass (or, equivalently, weight) of said section.

The discrete mass density distribution of FIG. 4B is then interpolated using a polynomial function, to determine the analytical expression of an approximated linear mass distribution. Advantageously, the polynomial function can be a spline which, unlike e.g. Lagrangian polynomials, is immune from Runge's phenomenon (an unwanted oscillation at the edges of the interpolation intervals). Preferably, a fifth order spline will be used to ensure C2 and parametric continuity.

Figure 5:
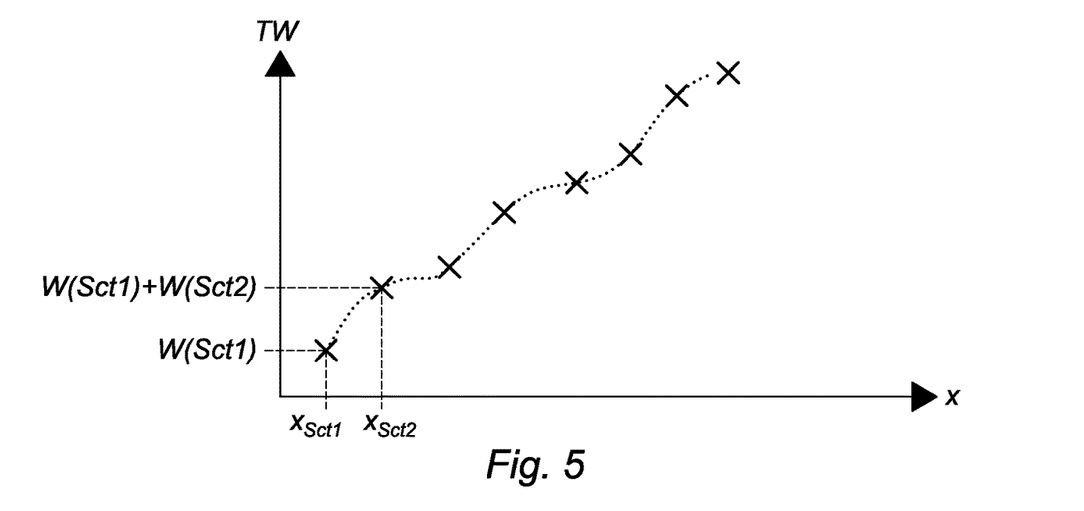
FIG. 5, the computation of a cumulative linear mass density distribution of the solid object according to an embodiment of the invention.

Integrating the linear mass distribution over x yields the cumulative linear mass distribution TW, which is plotted on FIG. 5. It can be seen that the cumulative linear mass distribution at point $x_{Sct1}$ is equal to W(Sct1) and that at point $x_{Sct2}$ is equal to W(Sct1)+W(Sct2), where $x_{Sct2}$ is the x coordinate of the center of the second section and W(Sct2) the weight of said second section.

Figure 6:
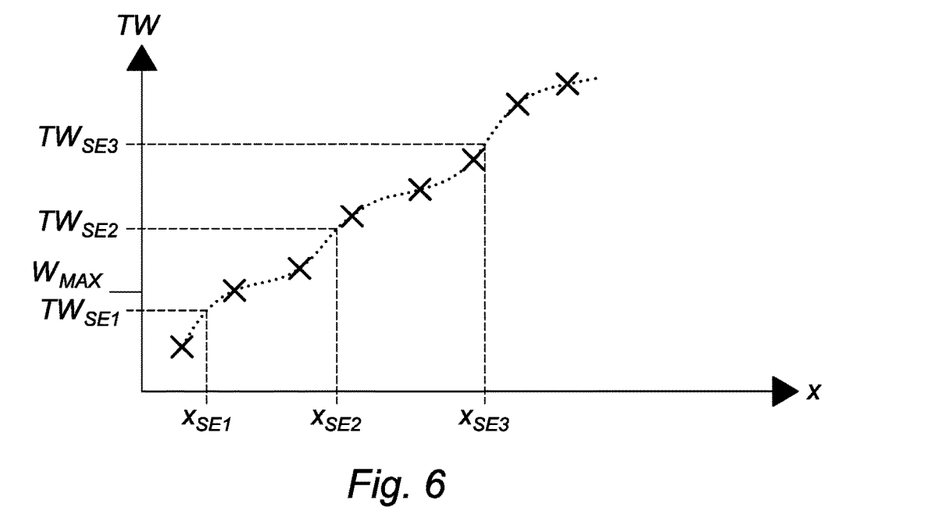
FIG. 6, the determination of the positions of the support elements along an axis of the solid object, according to an embodiment of the invention.

As shown by FIG. 6, in order to determine the optimal positions ($x_{SE1}$, $x_{SE2}$, $x_{SE3}$) of the support elements along the x axis, it is sufficient to divide the vertical (TW) axis of the cumulative linear mass distribution in a predetermined number of equal segments and to project the endpoints of said segments ($TW_{SE1}$, $TW_{SE2}$, $TW_{SE3}$) onto the cumulative linear mass distribution curve and then onto the x axis.

The number of segments is equal to that of support elements. This number is computed in order to ensure that the weight carried by each element is lower than the maximum allowed weigh $W_{MAX}$, specified by the support type definition. On FIG. 6, this corresponds to the condition $W_{MAX} < TW_{SE1}$. For instance, if the support elements are aligned along a single axis, the number N of supports may be taken equal to the "ceiling" function of the ratio between the total weight of the object, possibly multiplied by a security coefficient greater than or equal to 1, and $W_{MAX}$ (the "ceiling" function associates to a real number r the closest integer I such that I≥r). If the supports elements are aligned along two axes (or possibly more), the weight of the object multiplied by the security coefficient is split—equally or not—among the different sets of support elements aligned along respective axes.

These calculations may be repeated for positioning elements aligned along the y axis. It is possible in principle, but generally not useful, to use support elements aligned along more than two coplanar axes.

Figure 7:
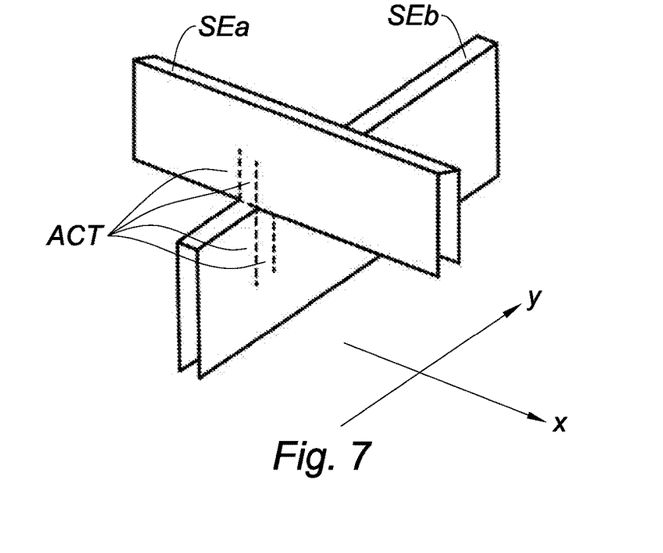
FIG. 7, the creation of cutouts enabling the assembly of the supporting structure, according to an embodiment of the invention.

FIG. 7 shows the assembly of two crossing support elements SEa, SEb using assembly slits ACT. SEa and SEb are U-shaped folded cardboard elements. They belong to different support types, as in the case of SEa the slits are positioned on the lower (open) side of the element, while in the case of SEb they are positioned on the upper (closed) side thereof. Given that the elements are U-shaped, and therefore comprise two vertical slabs forming the branches of the "U", there are two assembly slits for each element. For each element, the position of the slits along the x (for SEb) or y (for SEa) axis is given by the corresponding coordinate of the intersection point (determined considering the support element infinitely thin) plus or minus half of the thickness of the other element.

Figure 8:
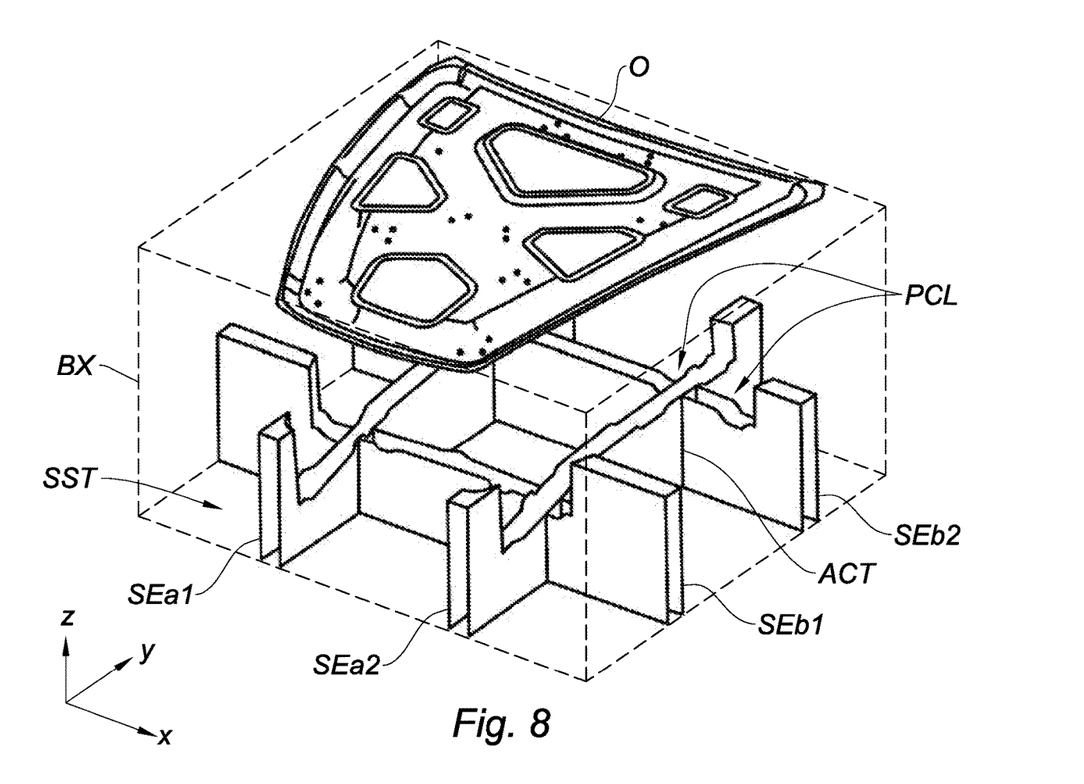
FIG. 8, the creation of cut-lines allowing the supporting structure to match the shape of the solid object.

FIG. 8 shows the 3D model of a supporting structure SST comprising four U-shaped cardboard support elements (SEa1, SEa2, aligned along the x axis and parallel to the y axis; SEb1, SEb2, aligned along the y axis and parallel to the x axis), assembled through slits ACT as discussed above and whose upper side is cut along cut lines PCL to match the shape of object O. The supporting structure is intended to be inserted into a box BX (represented in dashed line); the lengths of the support elements are determined in order to ensure a snug fit of the structure within the box: the length of the SEa1 and SEa2 elements will approximately correspond to the dimension of the box along the x axis, that of the SEb1 and SEb2 elements to its dimension along the y axis. The depth of the assembly slits will be determined in order to ensure that the lower sides of all the elements are coplanar and can lie onto the bottom of the box. The distance of the cut-lines PCL from said lower side, i.e. their position along the z axis, will be determined taking into account the dimension of the box along said z axis, the thickness of the object O and the possible presence of a protective element—or of another supporting structure of the same type, but oriented upside-down—on the upper side of the object.

The inventive method (except its physical manufacturing step, if present) can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 9:
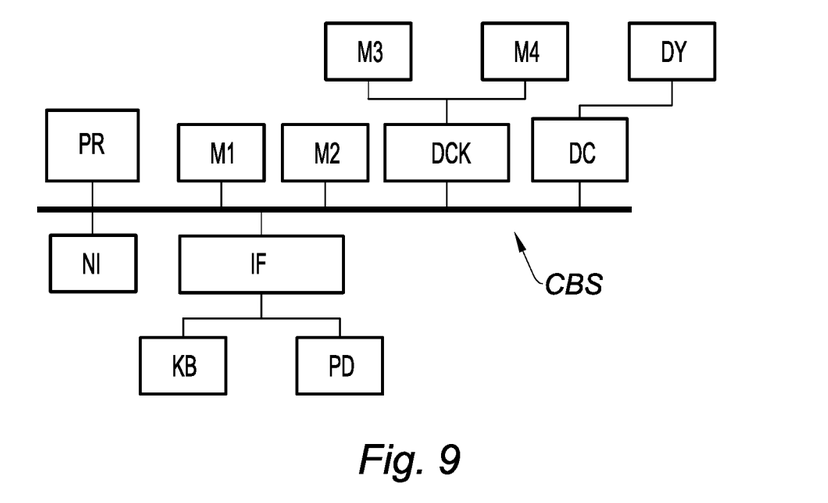
FIGS. 9 and 10, block diagrams of respective computer systems suitable for carrying out a method according to different embodiments of the invention.

A computer—more precisely a computer aided design station—suitable for carrying out a method according to an exemplary embodiment of the present invention is described with reference to FIG. 9. In FIG. 9, the computer includes a Central Processing Unit (CPU) PR which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. A database of solid objects, i.e. an organized set of digital models of solid objects, including their geometrical and physical properties and in particular their sizes and mass density distributions, in a form suitable to be processed by the executable program according to the inventive method—may also be stored on one or more of memory devices M1 to M4, or remotely.

A database of support element types, i.e. an organized set of digital models of support elements, including their geometrical and physical properties and in particular their maximum load, in a form suitable to be processed by the executable program according to the inventive method, may also be stored on one or more of said memory devices.

The claimed invention is not limited by the form of the computer-readable media on which the computer-readable instructions and/or the database(s) of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database(s) can be stored on a same memory device or on different memory devices.

Further, a computer program suitable for carrying out the inventive method can be provided as a utility application, background daemon, or component of an operating system, or combination thereof, executing in conjunction with CPU PR and an operating system such as Microsoft VISTA, Microsoft Windows 7, UNIX, Solaris, LINUX, Apple MAC-OS and other systems known to those skilled in the art.

CPU PR can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 9 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 10:
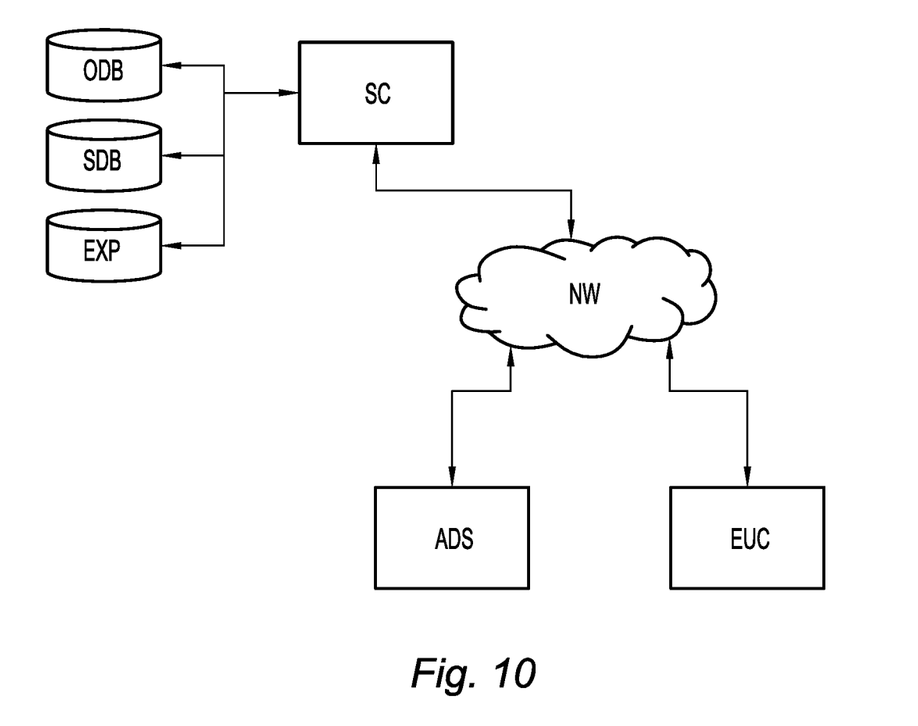

FIG. 10 is a block diagram of a computer system suitable for carrying out a method according to a different exemplary embodiment of the present invention.

In FIG. 10, the executable program EXP, the solid object database ODB and the support element type database SDB are stored on memory devices connected to a server SC. The memory devices and the overall architecture of the server may be the same as discussed above with reference to FIG. 9, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 9, except that the memory devices of the administrator system and the end user computer do not store the executable program EXP, the solid object database ODB and the support element type database SDB. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the solid object and support element type databases on the server via the network NW. This allows an end user to select an object and a support type from the respective databases and to modify them if required. The server performs the processing as described above with reference to FIGS. 2 to 8, and then transmits a three-dimensional model of the supporting structure, possibly including the solid object, to the end user computer, again using the network NW.

Although only one administrator system ADS and one end user computer EUC are shown, the system can support any number of administrator systems and/or end user systems without limitation. Similarly, multiple servers, object and support element can also be implemented in the system without departing from the scope of the present invention Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of designing a supporting structure (SST) for the packaging of a solid object (O) having a weight, the supporting structure comprising a plurality of linear support elements suitable to sustain the solid object inside a packaging container (BX), the method comprising the steps of:
   a) providing, as an input, a three-dimensional model of the solid object said three-dimensional model including a mass density distribution of the solid object;
   b) computing a first cumulative linear mass density distribution (TW) of the solid object according to a first axis; and
   c) using said first cumulative linear mass density distribution to determine positions along said first axis, of a first plurality of said linear support elements oriented transversally to said first axis, said positions being such that the weight of the solid object is evenly distributed among the linear support elements of said first plurality.

2. The method of claim 1 wherein:
   step b) also comprises computing a second cumulative linear mass density distribution of the solid object according to a second axis, non parallel to said first axis; and
   step c) also comprises using said second cumulative linear mass density distribution to determine positions, along said second axis, of a second plurality of said linear support elements oriented transversally to said second axis, said positions along said second axis being such that the weight of the solid object is also evenly distributed among the linear support elements of said second plurality.

3. The method of claim 2 wherein said first and second axes are mutually perpendicular.

4. The method of claim 2, further comprising a step d) of automatically defining cutouts (ACT) for allowing intersections between the linear support elements of said first and second pluralities.

5. The method of claim 1 wherein step b) comprises computing the following sub-steps:
   b1) sampling the solid object along said first axis by cutting it along said first axis into a predetermined number of sections;
   b2) computing a weight of each section;
   b3) computing a linear mass density distribution by interpolating the weight of the sections along the first axis; and
   b4) computing said first cumulative linear mass density distribution by numerically integrating said linear mass density distribution.

6. The method of claim 5, wherein sub-step b3) is carried out by spline interpolation.

7. The method of claim 1 wherein step c) further comprises determining a number of support elements as a function of the weight of the solid object and of a maximum load ($W_{MAX}$) of each support element of the first plurality of linear support elements.

8. The method of claim 1 further comprising a step a') of allowing a user to select at least a support element type from a database (SDB).

9. The method of claim 1 further comprising a step e) of automatically defining cut-lines (PCL) defining, for each support element of at least the first plurality, a profile matching a local shape of the solid object.

10. The method of claim 1 further comprising a step f) of creating a three-dimensional model of the supporting structure, comprising said linear support elements of at least the first plurality taking the positions determined at step c).

11. A computer program product comprising:
   a non-transitory computer-readable data-storage medium storing computer-executable instructions thereon; and
   the instructions being configured to cause a computer system to:
   a) provide, as an input, a three-dimensional model of a solid object said three-dimensional model including a mass density distribution of the solid object;
   b) compute a first cumulative linear mass density distribution (TW) of the solid object according to a first axis; and
   c) using said first cumulative linear mass density distribution, determine positions along said first axis, of a first plurality of said linear support elements oriented transversally to said first axis, said positions being such that the weight of the solid object is evenly distributed among the linear support elements of said first plurality.

12. A Computer Aided Design (CAD) system comprising:
   a computer memory;
   a processor coupled to the memory and a graphical user interface;
   the memory storing computer-executable instructions that cause the Computer Aided Design system to:
   a) provide, as an input, a three-dimensional model of a solid object said three-dimensional model including a mass density distribution of the solid object;
   b) compute a first cumulative linear mass density distribution (TW) of the solid object according to a first axis; and
   c) use said first cumulative linear mass density distribution and determine positions along said first axis, of a first plurality of said linear support elements oriented transversally to said first axis, said positions being such that the weight of the solid object is evenly distributed among the linear support elements of said first plurality.

13. The CAD system of claim 12 wherein:
   The CAD system computing at b) also comprises computing a second cumulative linear mass density distribution of the solid object according to a second axis, non-parallel to said first axis; and
   The CAD system using and determining at c) also comprises using said second cumulative linear mass density distribution and determining positions, along said second axis, of a second plurality of said linear support elements oriented transversally to said second axis, said positions along said second axis being such that the weight of the solid object is also evenly distributed among the linear support elements of said second plurality.

14. The CAD system of claim 13 wherein the memory further stores computer-executable instructions that cause the CAD system to:
   d) automatically define cutouts (ACT) for allowing intersections between linear support elements of said first and second pluralities.

15. A method of manufacturing a supporting structure useable in the packaging of solid objects comprising:
   designing a supporting structure (SST) for the packaging of a solid object (O) having a weight, the supporting structure comprising a plurality of linear support elements suitable to sustain the solid object inside a packaging container (BX), the designing generating a support structure design by:
  a) providing, as an input, a three-dimensional model of the solid object said three-dimensional model including a mass density distribution of the solid object;
  b) computing a first cumulative linear mass density distribution (TW) of the solid object according to a first axis; and
  c) using said first cumulative linear mass density distribution, determining positions along said first axis, of a first plurality of said linear support elements oriented transversally to said first axis, said positions being such that the weight of the solid object is evenly distributed among the linear support elements of said first plurality;
using the generated support structure design, physically manufacturing said supporting structure, as designed.

16. A supporting structure (SST) for the packaging of a solid object (O), the supporting structure obtained by:
  designing the supporting structure, the supporting structure comprising a plurality of linear support elements suitable to sustain the solid object inside a packaging container (BX), the designing generating a support structure design by:
    a) providing, as an input, a three-dimensional model of the solid object, said three-dimensional model including a mass density distribution of the solid object;
    b) computing a first cumulative linear mass density distribution (TW) of the solid object according to a first axis; and
    c) using said first cumulative linear mass density distribution, determining positions along said first axis, of a first plurality of said linear support elements oriented transversally to said first axis, said positions being such that weight of the solid object is evenly distributed among the linear support elements of said first plurality; and
  using the generated support structure design, physically manufacturing said supporting structure, as designed.

* * * * *